(12) United States Patent
Dudar et al.

(10) Patent No.: US 12,668,232 B2
(45) Date of Patent: Jun. 30, 2026

(54) REVERSE DRIVE AND DIG MODE

(71) Applicant: Ford Global Technologies, LLC, Dearborn, MI (US)

(72) Inventors: Aed M. Dudar, Canton, MI (US); Thomas G. Leone, Ypsilanti, MI (US)

( * ) Notice: Subject to any disclaimer, the term of this patent is extended or adjusted under 35 U.S.C. 154(b) by 552 days.

(21) Appl. No.: 18/333,550

(22) Filed: Jun. 13, 2023

(65) Prior Publication Data

US 2024/0416894 A1 Dec. 19, 2024

(51) Int. Cl.
_B60W 30/045_ (2012.01)
_B60W 10/184_ (2012.01)
_B60W 10/20_ (2006.01)

(52) U.S. Cl.
CPC ........ _B60W 30/045_ (2013.01); _B60W 10/184_ (2013.01); _B60W 10/20_ (2013.01); _B60W 2540/18_ (2013.01); _B60W 2710/083_ (2013.01)

(58) Field of Classification Search
CPC .. B60W 30/045; B60W 10/184; B60W 10/20; B60W 2540/18; B60W 2710/083; B60W 2050/146; B60W 30/18036
USPC ......................................................... 701/41
See application file for complete search history.

(56) References Cited

U.S. PATENT DOCUMENTS

| | | | |
|---|---|---|---|
| 11,318,947 B2 | 5/2022 | Hassel et al. | |
| 2010/0049413 A1* | 2/2010 | Makino .................. | B60W 30/06 |
| | | | 701/65 |
| 2018/0162354 A1* | 6/2018 | De Hesselle ....... | B60W 40/101 |
| 2019/0217748 A1* | 7/2019 | Krnja ..................... | B60N 2/809 |
| 2021/0214001 A1 | 7/2021 | Solomon et al. | |
| 2022/0097704 A1 | 3/2022 | Collins | |
| 2023/0373516 A1* | 11/2023 | Won ..................... | B60K 35/223 |

FOREIGN PATENT DOCUMENTS

WO 2022109386 A1 5/2022

OTHER PUBLICATIONS

Zhi Yang et al., Study on Road Feeling Simulation Control Algorithm for Four-Wheel Independent Drive and Steering Electric Vehicle, IEEE, Oct. 20, 2017, pp. 4872-4875.

* cited by examiner

*Primary Examiner* — Yi-Kai Wang
(74) *Attorney, Agent, or Firm* — Emily Campbell; Eversheds Sutherland (US) LLP

(57) ABSTRACT

Systems and methods for implementing reverse dig mode and/or reverse drive mode. Reverse dig mode may involve determining an inner front wheel and outer front wheel relative to steering controls and simultaneously applying a forward torque to the inner front wheel of the vehicle and a reverse torque to the outer front wheel of the vehicle. Reverse drive mode may involve determining steering controls of a vehicle and applying inverted controls to the rear wheels of the vehicle that provides a simulated sense that the driver is handling the vehicle in the forward direction.

14 Claims, 6 Drawing Sheets

Conventional
Turn with
Reduced
Turn Radius

Conventional
Turn with
Reduced
Turn Radius

300

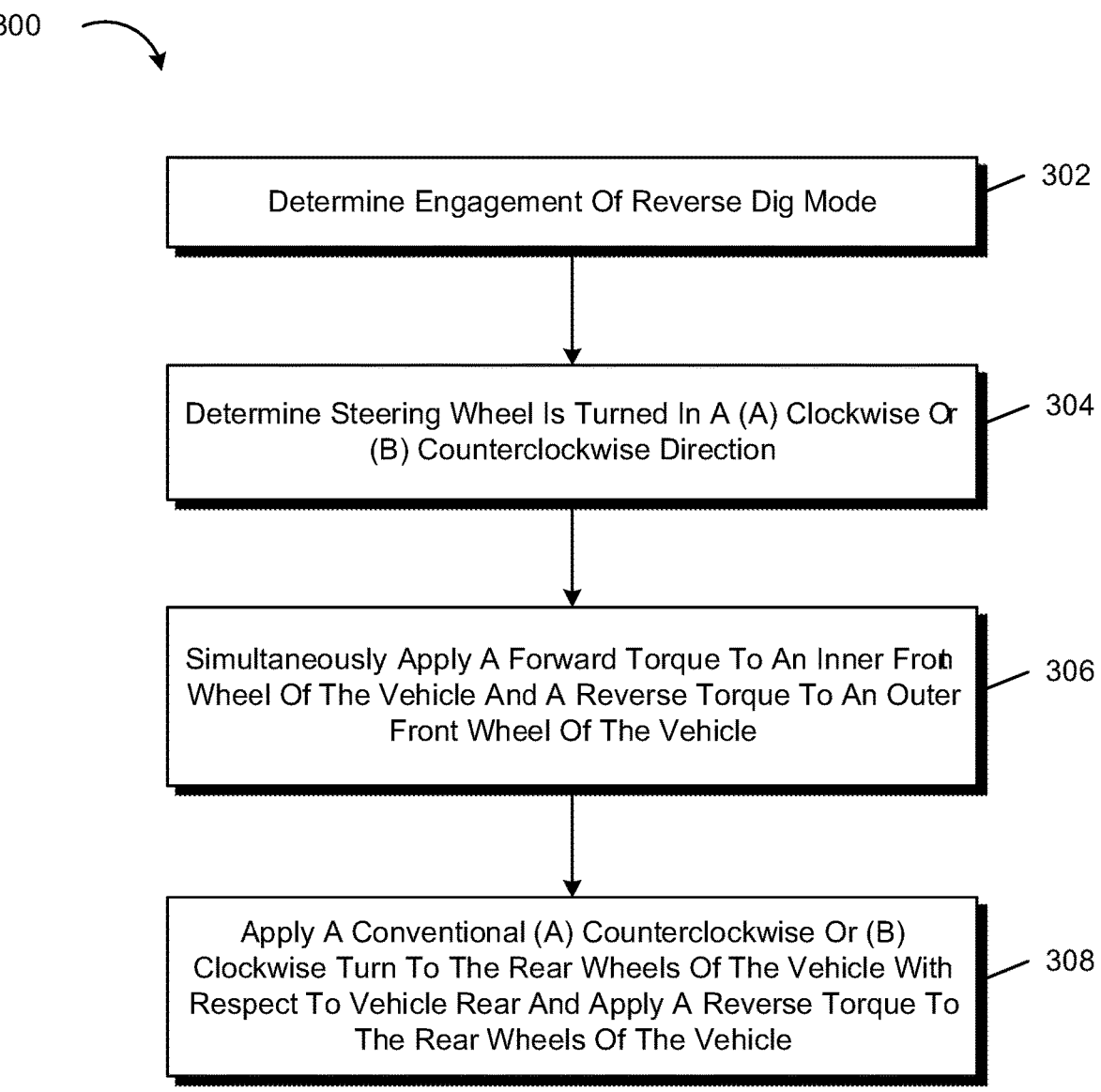

302 — Determine Engagement Of Reverse Dig Mode

304 — Determine Steering Wheel Is Turned In A (A) Clockwise Or (B) Counterclockwise Direction 306 — Simultaneously Apply A Forward Torque To An Inner Front Wheel Of The Vehicle And A Reverse Torque To An Outer Front Wheel Of The Vehicle 308 — Apply A Conventional (A) Counterclockwise Or (B) Clockwise Turn To The Rear Wheels Of The Vehicle With Respect To Vehicle Rear And Apply A Reverse Torque To The Rear Wheels Of The Vehicle

FIG. 3

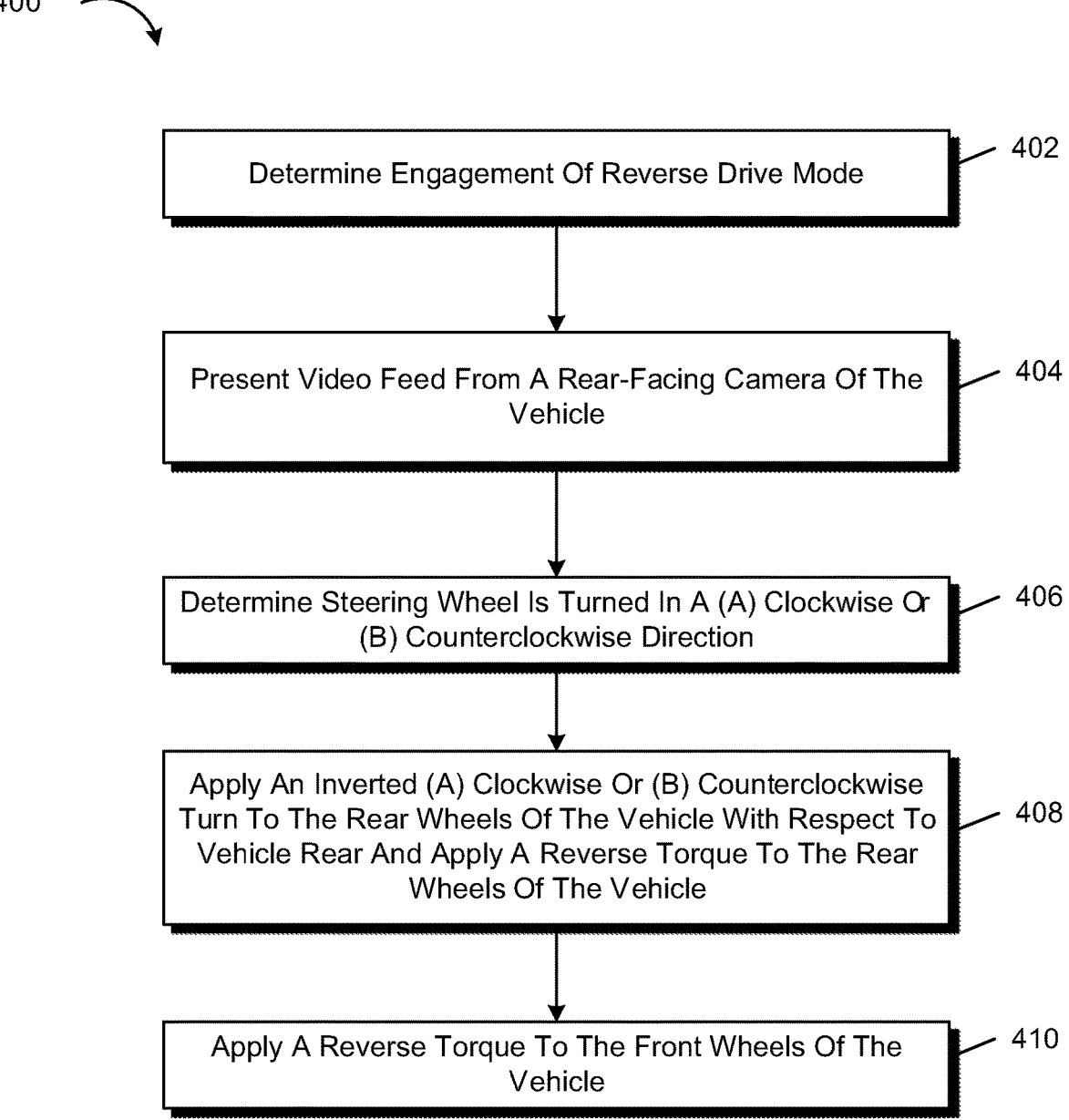

400

Determine Engagement Of Reverse Drive Mode — 402

Present Video Feed From A Rear-Facing Camera Of The Vehicle — 404

Determine Steering Wheel Is Turned In A (A) Clockwise Or (B) Counterclockwise Direction — 406

Apply An Inverted (A) Clockwise Or (B) Counterclockwise Turn To The Rear Wheels Of The Vehicle With Respect To Vehicle Rear And Apply A Reverse Torque To The Rear Wheels Of The Vehicle — 408

Apply A Reverse Torque To The Front Wheels Of The Vehicle — 410

FIG. 4

REVERSE DRIVE AND DIG MODE

BACKGROUND

Driving a vehicle in reverse may present a unique challenge for certain human drivers. Unlike driving forward, where drivers have a clear view of the road ahead, driving in reverse requires drivers to use different motor skills from those that they are accustomed to while in a forward mode of operation. Driving in reverse may require the driver to turn their head and body to look behind them, use the steering wheel in a different way, and rely on the vehicle's mirrors to navigate.

Furthermore, reverse driving may often occur in challenging environmental condition that require drivers to make complex spatial judgments. For example, if a vehicle is driven forward into a one-way alley or on a single-lane mountain road, the vehicle may not have sufficient space to make a K-turn, U-turn, or otherwise re-orient the vehicle to allow for backtracking. In such a scenario, the driver's only option may be to backtrack by driving in reverse. These tasks may require the driver to have a good sense of spatial orientation and depth perception.

It would be desirable to have systems or methods that may enhance the operation of vehicles while driving in reverse.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 3 shows an illustrative example of a process for implementing reverse dig mode using a controller system of a vehicle, in accordance with one or more example embodiments of the present disclosure FIG. 4 shows an illustrative example of a process for implementing reverse drive mode using a controller system of a vehicle, in accordance with one or more example embodiments of the present disclosure.

DETAILED DESCRIPTION

Overview

Figure 1:
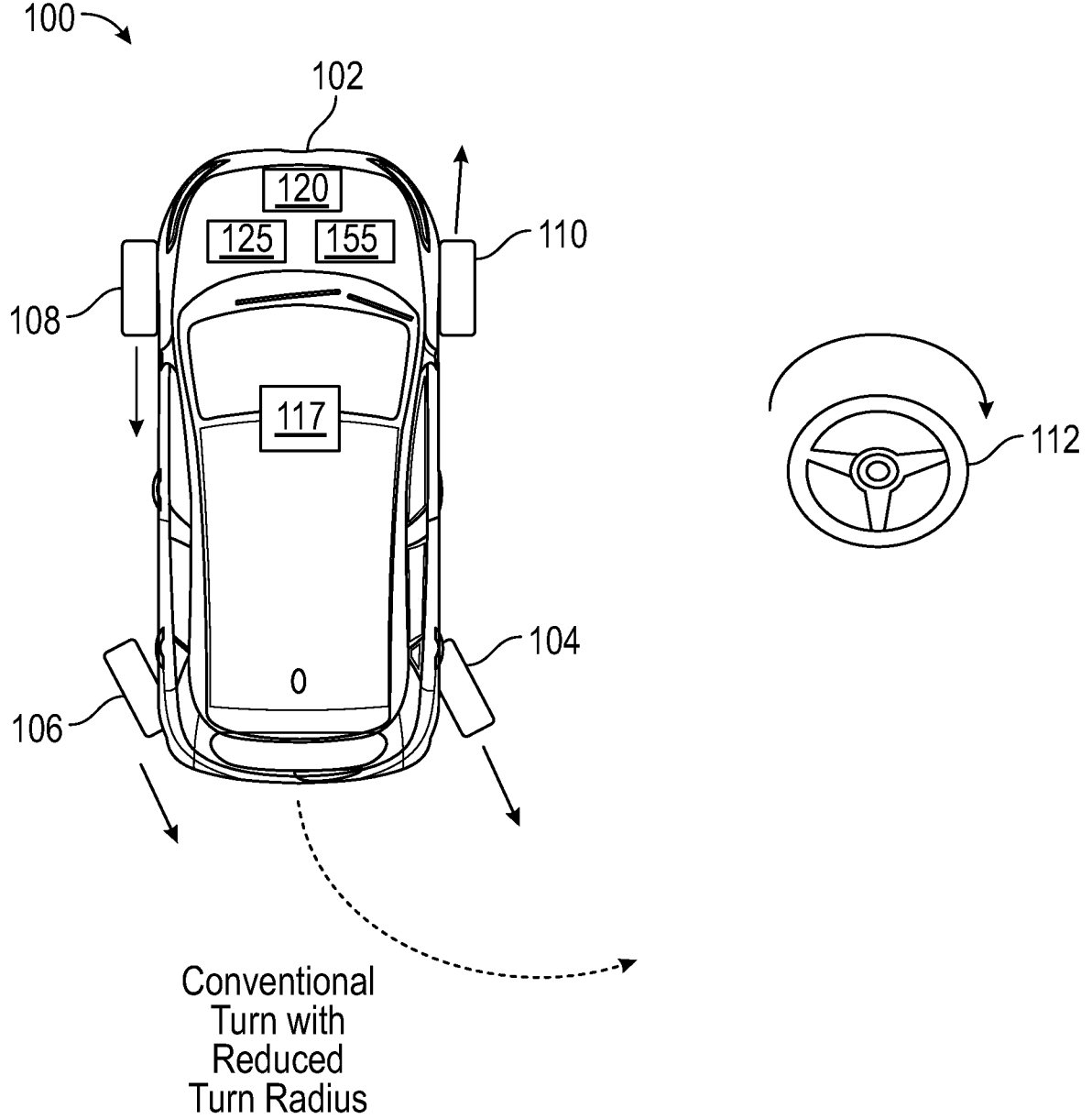
FIG. 1 depicts an illustrative environment in which systems and methods for reverse dig mode may be implemented, in accordance with at least one embodiment of the present disclosure.

The present disclosure is directed to systems and methods for reverse drive and dig mode. In various embodiments, techniques described herein are implemented on electric vehicle (EV) platforms that are capable of delivering torque to each tire independently. In contrast, conventional internal combustion engine (ICE) vehicles may only be able to deliver torque to a set of wheel (e.g., front or rear wheels) or all wheels at once. Reverse dig and drive mode may apply torque to the front and rear tires independently while a vehicle is being driven in reverse.

Reverse dig mode may refer to a mode of operation in which a vehicle is being driven in reverse by applying a forward torque to at least a first front wheel of a vehicle and simultaneously applying a reverse torque to at least a second front wheel of the vehicle. Reverse dig can provide for a reduced turn radius when the forward travel direction is a dead end or turning around is not feasible due to high water, snow, mud sand, etc., and reversing in a tight space is the best course of action. Reverse dig mode can be utilized to move the vehicle when the front tires are wedged against a rock, when there is a lack of space turning, or other situations in which reverse dig mode will provide a convenient means for navigating through an environment.

In various embodiments, a vehicle operator engages reverse dig mode through a human-machine interface (HMI). An electrical controller system may configure the vehicle so that the rear tires follow the steering wheel has an inverted input while the inside front tire has reversed torque applied and the outside front tire has a forward torque applied. In various embodiments, the steering wheel input is similar to reversing where a clockwise (CW) steering wheel motion makes the vehicle turn in a counterclockwise (CCW) direction. However, the exterior tire has reverse or holding torque while the interior tire has a forward torque.

Conventional means for reverse driving place drivers in challenging and often uncomfortable driving conditions. For example, driving in reverse may force the driver to be in an uncomfortable posture in which his or her head is turned around to look behind the vehicle and/or control the steering wheel with one hand. Alternative means of controlling the vehicle also present challenges-using a rear view mirror provides only a narrow field of view and requires drivers and drivers may not be accustomed to rely on a mirror to survey their surroundings. Even when a vehicle has a rear-facing camera, the handling of a vehicle in reverse differs significantly from when it is being driving in the forward direction-when driving forward, the leading tires will turn and the trailing tires will be straight, whereas when driving in reverse, the leading tires are straight and the trailing tires will turn, giving the vehicle different handling characteristics. Overall, it should be appreciated that conventional means for reverse driving are challenging for many drivers and require drivers to use different set of motor skills from what drivers are typically used to. These challenges can be compounded because many situations in which reverse driving is required for long distances can involves narrow roads or other stressful environments where turning the vehicle around is impossible due to insufficient turning space.

Furthermore, reverse driving may often occur in challenging environmental condition that require drivers to make complex spatial judgments. For example, if a vehicle is driven forward into a one-way alley or on a single-lane mountain road, the vehicle may not have sufficient space to make a K-turn, U-turn, or otherwise re-orient the vehicle to allow for backtracking. In such a scenario, the driver's only option may be to backtrack by driving in reverse. However, these tasks may require the driver to have a good sense of spatial orientation and depth perception, which may be difficult for some people.

A vehicle may also or alternatively implement reverse drive mode. Reverse drive mode may be used when a vehicle has driven a distance on a narrow road, mountain trail, alley, etc. and finds the road blocks and must turn around to go back. Turning the vehicle may not be an option due to a lack of space. In reverse drive mode, the front and rear tires both spin in the same direction (e.g., in reverse) but the rear tires provide steering, which provides the inverse to normal driving. Additionally, to harmonize the rear steering method while driving in reverse and make the operating characteristics more similar to normal driving in the forward direction, steering controls are inverted such that a counterclockwise turn of the steering wheel results in an inverted CCW turn with respect to the vehicle rear and a CW turn of the steering wheel results in an inverted CW turn with respect to the vehicle rear. This provides drivers with more familiar steering and operating characteristics for the vehicle when being driven in reverse and allows for drivers to experience operating conditions that are more familiar to what they are accustomed to when driving in the normal forward direction.

In various embodiments, reverse drive mode may be used when a vehicle does not have enough space to turn around. In such cases, the only option may be to drive the vehicle in reverse. This may lead to a challenging driving environment FIG. 1 depicts an illustrative environment 100 in which systems and methods for reverse dig mode may be implemented, in accordance with at least one embodiment of the present disclosure.

In various embodiments, reverse dig mode may be engaged on an electric vehicle. While internal combustion engine (ICE) vehicles typically deliver torque to a set of wheels or all wheels at once, an EV is able to deliver torque to each tire independently. Similarly, with steering functionality, the steering wheel of an ICE vehicle is mechanically linked to the front two tires and when the driver turns the wheel, the tires turn in kind.

In various embodiments, reverse dig mode is engaged by a controller system of a vehicle 102. For illustrative purposes, vehicle 102 is depicted with two front wheels and two back wheels. When reverse dig mode is applied, the controller system of the vehicle may provide a reverse torque to rear wheel 104 and/or rear wheel 106 (e.g., by providing a reverse torque to a drive shaft for the rear wheel(s)) using one or more rear motors. In various embodiments, the controller system provides a reverse torque to the outer front wheel (e.g., wheel 108), for example, by providing a reverse torque to a front drive shaft using one or more front motors. In various embodiments, the controller system provides a forward torque to the inner front wheel (e.g., wheel 110), for example, by applying a brake to the inner front wheel.

When an operator of vehicle 102 turns the steering wheel 112 of the vehicle, a conventional turn may be performed using the rear tires. For example, as depicted in FIG. 1, if a driver turns the steering wheel of the vehicle clockwise (CW), then it may result in a conventional counterclockwise (CCW) turn with respect to the rear of the vehicle. Likewise, if the driver turns the steering wheel of the vehicle CCW (not depicted in FIG. 1), then it may result in a conventional CW turn with respect to the vehicle rear. In this way, the vehicle operates similarly when the vehicle is being reversed, but albeit with greater traction and a narrower turning radius than would otherwise be available when driving in reverse conventionally. In various embodiments, reverse dig mode may be used to execute a 180-degrees turn for the vehicle with a reduced turn radius as compared to conventional means for turning around the vehicle.

Reverse dig mode may be engaged by an operator of vehicle 102. For example, in various embodiments, a driver interacts with a human-machine interface (HMI), for example, via a touchscreen, to engage reverse dig mode. In some embodiments, a button located within the cabin of the vehicle—for example, on a center console or on the steering wheel—may be pressed to engage reverse dig mode. In various embodiments, the driver may be presented with a notification or recommendation to engage reverse dig mode if the driver attempts to reverse the vehicle but is stalled (e.g., due to high water, snow mud, sand, etc. causing one or both front wheels to be stuck). In some embodiments, reverse dig mode is engaged by an autonomous or semi-autonomous driving assistance feature of vehicle 102.

Figure 2:
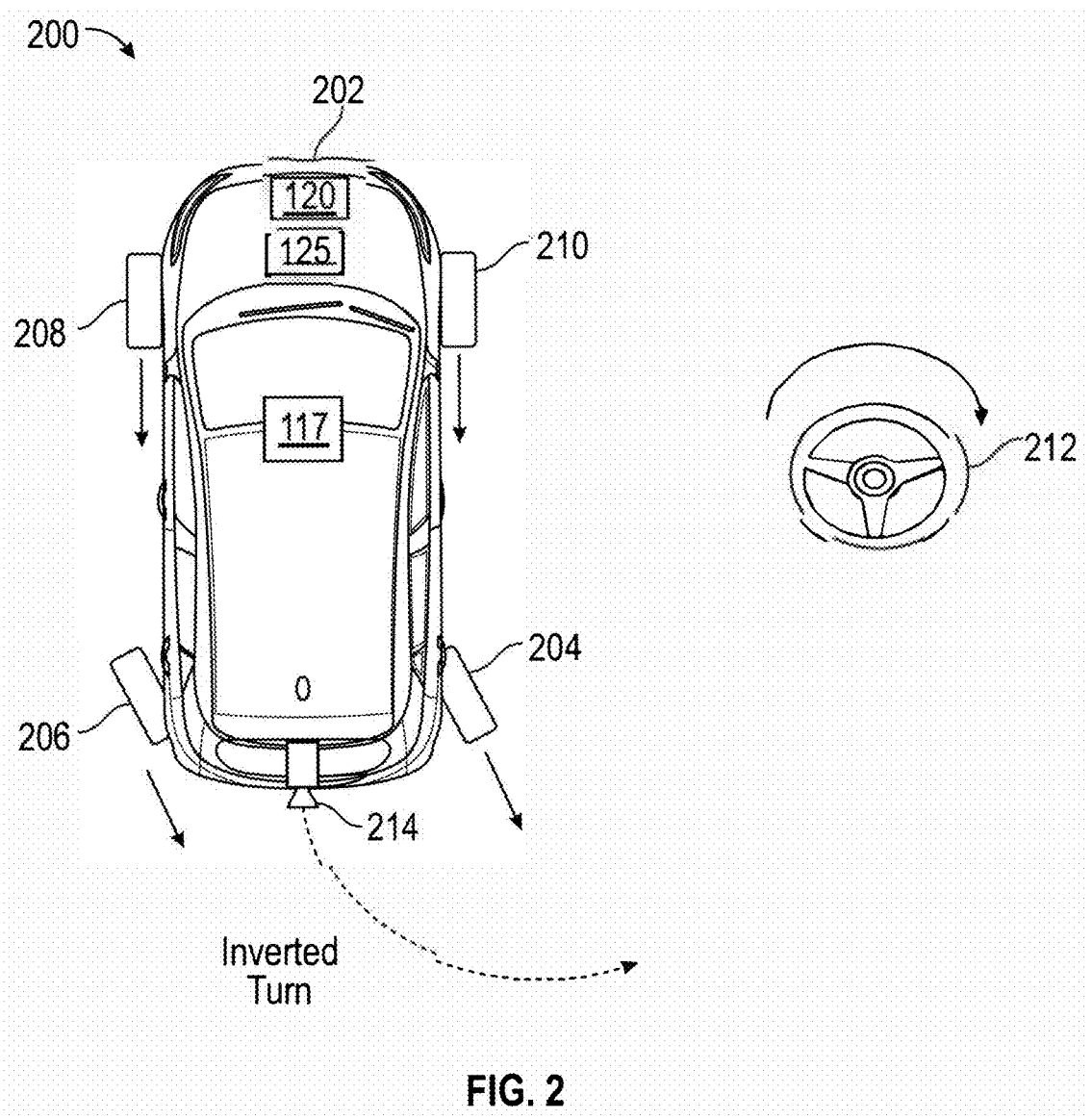
FIG. 2 depicts an illustrative environment in which systems and methods for reverse drive mode may be implemented, in accordance with at least one embodiment of the present disclosure.

FIG. 2 depicts an illustrative environment 200 in which systems and methods for reverse drive mode may be implemented, in accordance with at least one embodiment of the present disclosure.

In various embodiments, reverse drive mode may be engaged on an electric vehicle and can be used to provide the operator of the vehicle with more natural steering characteristics similar to as if the operator were driving in a forward direction. This may help drivers to feel more comfortable navigating tight spaces, winding roads, etc., which may necessitate driving in reverse because there is not enough room for the vehicle to be turned around.

In various embodiments, reverse drive mode is engaged by a controller system of a vehicle 202. For illustrative purposes, vehicle 202 is depicted with two front wheels and two back wheels. When reverse drive mode is applied, the controller system of the vehicle may provide a reverse torque to rear wheel 204 and/or rear wheel 206 (e.g., by providing a reverse torque to a drive shaft for the rear wheel(s)) using one or more rear motors. In various embodiments, the controller system provides a reverse torque to front wheel 208 and/or front wheel 210 (e.g., by providing a reverse torque to a drive shaft for the front wheel(s)) using one or more front motors. In some embodiments, the front motor is optionally engaged, for example, when all-wheel-drive (AWD) is engaged.

When an operator of vehicle 202 turns the steering wheel 212 of the vehicle, a conventional turn may be performed using the rear tires. For example, as depicted in FIG. 2, if a driver turns the steering wheel of the vehicle counterclockwise (CCW), the controller system may invert the control of the rear wheels so that the CCW steering wheel turn results in an inverted counterclockwise (CCW) turn with respect to the rear of the vehicle. Likewise, if the driver turns the steering wheel of the vehicle clockwise (CW, not depicted in FIG. 2), then the controller system may incenter the control of the rear wheels so that the CW steering wheel turn results in an inverted CW turn with respect to the vehicle rear. In this way, the vehicle operates similar turning characteristics to when the vehicle is being drive in the forward direction.

Reverse drive mode may be engaged by an operator of vehicle 202. For example, in various embodiments, a driver interacts with a human-machine interface (HMI), for example, via a touchscreen, to engage reverse drive mode. In some embodiments, a button located within the cabin of the vehicle—for example, on a center console or on the steering wheel—may be pressed to engage reverse drive mode.

When reverse drive mode is engaged, the vehicle 202 may turn passenger seats of the vehicle 180-degrees so that passengers of the vehicle may be oriented to face the direction of travel. This may be done to reduce motion sickness, or to provide passengers of a vehicle (e.g., self-driving vehicle) with a view of the terrain being traversed by the vehicle.

The driver of a vehicle 202 may be provided with additional assistance with reverse drive mode. In some embodiments, a display screen of the vehicle will display a video feed from a rear-facing camera 214 so that the driver is able to steer the vehicle based on the video feed. Rear-facing camera 214 is an illustrative, non-limiting example of a type of sensor that can be used to guide the vehicle in reverse drive mode. Other sensors may be used in place of, or in combination with, rear-facing camera 214 depicted in FIG. 2. In some embodiments, an augmented reality overlay will be presented as a heads-up display (HUD) over the front windshield of the vehicle, projecting a rear-facing view onto the front windshield. Doing so will provide the driver with a sensation that he or she is seeing the road ahead and can input steering commands as if they were driving in a forward direction. These controls will be inverted by the controller system and applied by the rear wheels/motors, which provides the driver with similar handling characteristics as if the vehicle were being driving in the normal, forward, mode of operation. In some embodiments, reverse drive mode is engaged by an autonomous or semi-autonomous driving assistance feature of vehicle 202.

FIG. 3 shows an illustrative example of a process 300 for implementing reverse dig mode, in accordance with one or more example embodiments of the present disclosure. In at least one embodiment, some or all of the process 300 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program storing a plurality of computer-readable instructions executable by one or more processors. The computer-readable storage medium, in at least one embodiment, is a non-transitory computer-readable medium. In at least one embodiment, at least some of the computer-readable instructions usable to perform the process 300 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 300 may be implemented in the context of various systems and methods described elsewhere in this disclosure, such as those discussed in connection with FIG. 1. In at least one embodiment, process 300 or a portion thereof is collectively implemented by a controller system of a vehicle. In various embodiments, steps of process 300 and/or other processes performed by a vehicle will utilize the controller system.

In various embodiments, process 300 comprises a step 302 to determine engagement of reverse dig mode. For example, in various embodiments, a driver interacts with a human-machine interface (HMI), for example, via a touchscreen, to engage reverse dig mode. In some embodiments, a button located within the cabin of the vehicle—for example, on a center console or on the steering wheel—may be pressed to engage reverse dig mode. In various embodiments, the driver may be presented with a notification or suggestion to engage reverse dig mode if the driver attempts to reverse the vehicle but is stalled (e.g., due to high water, snow mud, sand, etc. causing one or both front wheels to be stuck). In some embodiments, reverse dig mode is automatically engaged if the controller system determines that the front wheels are stuck or otherwise unable to provide forward and/or reverse movement.

In various embodiments, process 300 comprises a step 304 to determine steering wheel is turned in a clockwise or counterclockwise direction. When the controller system determines the direction in which the steering wheel is being turned—CW or CCW—the controller system may determine the manner in which dig mode should apply torque to the front and/or back wheels. The direction to which the steering wheel is being turned may be used to identify an inner front wheel and an outer front wheel. For a clockwise turn, the front right wheel may be referred to as the inner front wheel and the front left wheel may be referred to as the outer front wheel. Conversely, for a counterclockwise turn, the front left wheel may be referred to as the inner front wheel and the front right wheel may be referred to as the outer front wheel. The inner and outer wheels may be defined relative to the turn radius.

In various embodiments, process 300 comprises a step 306 to simultaneously apply a forward torque to the inner front wheel of the vehicle and a reverse torque to the outer front wheel of the vehicle. In various embodiments, a front motor is used to apply a reverse torque to the outer front wheel. In some embodiments, the forward torque is applied to the inner front wheel through braking or a applying a forward torque to the inner front wheel using a second front motor that controls the inner front wheel.

In various embodiments, process 300 comprises a step 308 to apply a conventional clockwise or counterclockwise turn to the rear wheels of the vehicle with respect to the vehicle rear. In some embodiments, the controller system of the vehicle will optionally apply a reverse torque to the rear wheels of the vehicle, for example, by engaging one or more rear motors of the vehicle. In various embodiments, a conventional counterclockwise turn is applied in response to the steering wheel being turned clockwise, and a conventional clockwise turn is applied in response to the steering wheel being turned in a counterclockwise direction. This allows for the vehicle to extricate itself if the front tires are stuck due to high water, snow, mud sand, etc. In various embodiments, reverse dig mode can be used to turn the vehicle around with a significantly reduced turn radius as compared to the amount of space that is needed to execute a U-turn or K-turn.

In various embodiments, reverse dig mode is engaged by a user commands received via a human-machine interface (HMI) of the vehicle, button, or other activation mechanism of the vehicle.

In some embodiments, reverse dig mode is automatically engaged in response to a determination that one or more of the front wheels are stuck. The determination may be made by the controller system of a vehicle and may be based on various sensor readings, such as wheel traction readings. In some embodiments, the driver of the vehicle may be presented with a recommendation or notification to use reverse dig mode as an option. Audio and/or visual indications may be presented to engage reverse dig mode, for example, a prompt may be presented on an HMI of the vehicle (e.g., touchscreen).

In various embodiments, reverse dig mode applies a forward torque to the inner front wheel by applying brakes to the inner front wheel and/or applies a reverse torque to the outer front wheel of the vehicle using a rear motor. In some embodiments, separate motors control the inner front wheel and outer front wheel and the respective forward and reverse torques may be applied by the respective motors that control the inner and outer wheels. For example, in reverse dig mode, a counterclockwise turn of the steering wheel results in a clockwise turn of the rear wheels and a clockwise turn of the steering wheel results in a counterclockwise turn of the rear wheels.

FIG. 4 shows an illustrative example of a process 400 for implementing reverse drive mode, in accordance with one or more example embodiments of the present disclosure. In at least one embodiment, some or all of the process 400 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program storing a plurality of computer-readable instructions executable by one or more processors. The computer-readable storage medium, in at least one embodiment, is a non-transitory computer-readable medium. In at least one embodiment, at least some of the computer-readable instructions usable to perform the process 400 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 400 may be implemented in the context of various systems and methods described elsewhere in this disclosure, such as those discussed in connection with FIG. 2. In at least one embodiment, process 400 or a portion thereof is collectively implemented by a controller system of a vehicle. In various embodiments, steps of process 400 and/or other processes performed by a vehicle will utilize the controller system.

In various embodiments, process 400 comprises a step 402 to determine engagement of reverse drive mode. For example, in various embodiments, a driver interacts with a human-machine interface (HMI), for example, via a touch-screen, to engage reverse drive mode. In some embodiments, a button located within the cabin of the vehicle—for example, on a center console or on the steering wheel—may be pressed to engage reverse drive mode. In various embodiments, the driver may be presented with a notification or suggestion to engage reverse drive mode if a narrow reverse path is detected by the vehicle's rear-facing camera.

In various embodiments, process 400 comprises a step 404 to present a video feed from a rear-facing camera of the vehicle. The rear-facing camera may provide a wide-angle view that can be used for navigating the vehicle in a reverse direction. In some embodiments, a display screen of the vehicle will display a video feed from a rear-facing camera so that the driver is able to steer the vehicle based on the video feed. In some embodiments, an augmented reality overlay will be presented as a heads-up display (HUD) over the front windshield of the vehicle, projecting a rear-facing view onto the front windshield. Doing so will provide the driver with a sensation that he or she is seeing the road ahead and can input steering commands as if they were driving in a forward direction. These controls will be inverted by the controller system and applied by the rear wheels/motors, which provides the driver with similar handling characteristics as if the vehicle were being driving in the normal, forward, mode of operation. For example, a counterclockwise turn of the steering wheel results in an inverted counterclockwise turn of the rear wheels and a clockwise turn of the steering wheel results in an inverted clockwise turn of the rear wheels.

In various embodiments, process 400 comprises a step 406 to determine the steering wheel is turned in a (A) clockwise or (B) counterclockwise direction. A driver of the vehicle may control the steering wheel to cause the vehicle to turn. Process 400 may proceed to step 408 and apply an inverted (A) clockwise or (B) counterclockwise turn to the rear wheels of the vehicle with respect to the vehicle's rear. In various embodiments the inverted controls and the video feed in combination provide the driver with a simulated sense that the driver is handling the vehicle in the forward direction, that is, when the driver turns the steering wheel in the clockwise direction, the driver will see in the video feed that the vehicle is executing a clockwise turn. Additionally, because the rear wheels are applying the inverted controls, the vehicle's handling characteristics will be similar to as if the driver is driving in the normal, forward direction. In some embodiments, process 400 also comprises a step 410 to apply a reverse torque to the front wheels of the vehicle.

In various embodiments, the video feed is presented to the operator of the vehicle on a human-machine interface (HMI) of the vehicle. In some embodiments, video feed is projected to an augmented reality overlay over a front windshield of the vehicle.

Process 400 may, in some cases, also comprise a step for turning one or more passenger seats of the vehicle to be rear-facing, such as when the vehicle is an autonomous vehicle.

Certain words and phrases are used herein solely for convenience and such words and terms should be interpreted as referring to various objects and actions that are generally understood in various forms and equivalencies by persons of ordinary skill in the art. For example, the phrase "electric vehicle" (EV) and the phrase "battery electric vehicle" (BEV) may be used interchangeably in this disclosure and must be understood to refer to any type of vehicle that operates an electric motor by use of a rechargeable battery. The word "battery" as used herein encompasses a single battery as well as a set of batteries that are interconnected to form a battery bank. It must be understood that words such as "implementation," "scenario," "case," "application," and "situation" are to be understood as examples in accordance with the disclosure. It should be understood that the word "example" as used herein is intended to be non-exclusionary and non-limiting in nature.

Figure 5:
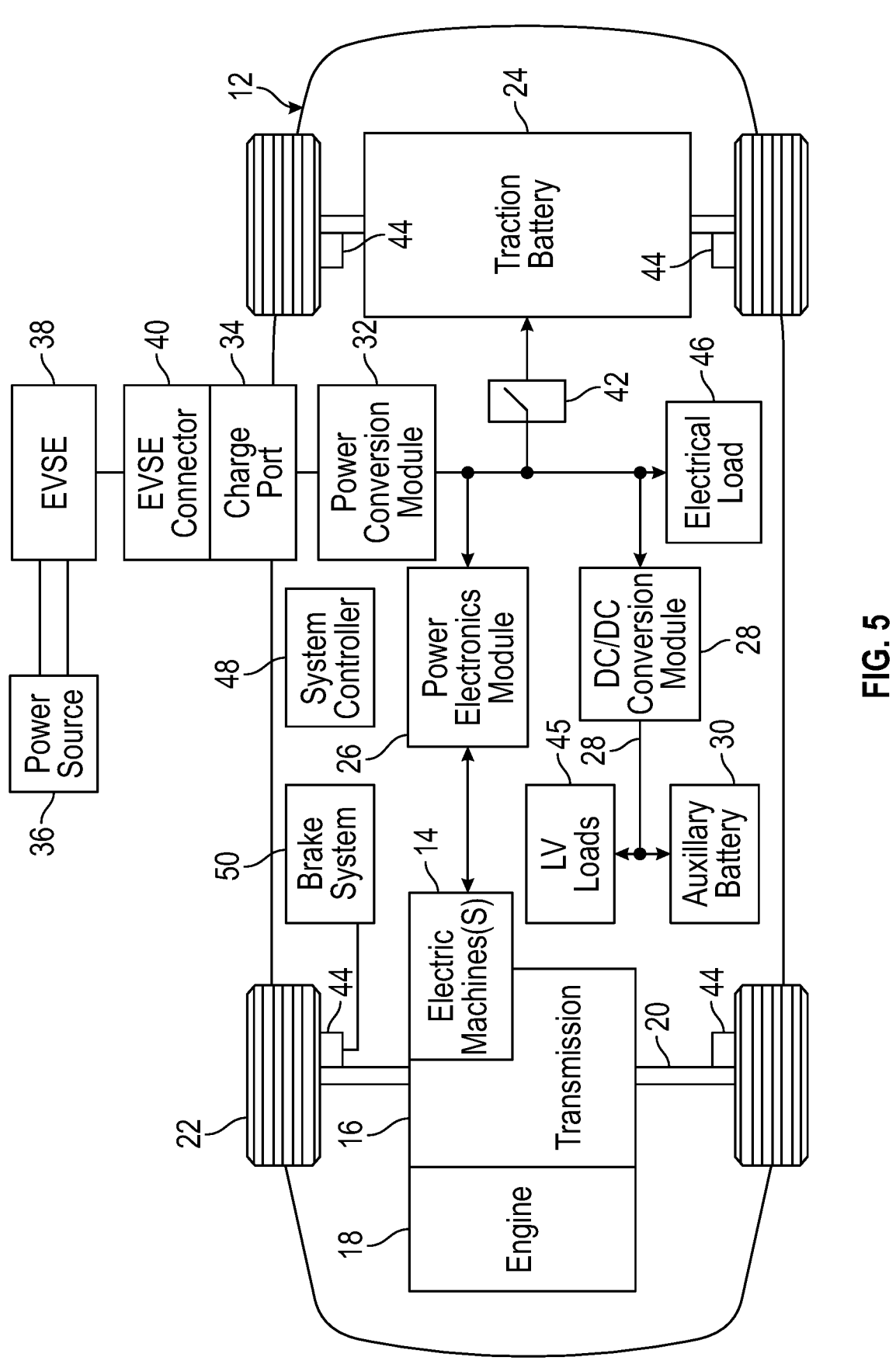
FIG. 5 illustrates a diagram 500 of an example of an electrified vehicle, referred to as an electrified vehicle 12 herein, according to at least one embodiment of the present disclosure.

FIG. 5 illustrates a diagram 500 of an example of an electrified vehicle, referred to as an electrified vehicle 12 herein, according to at least one embodiment of the present disclosure. In this example, the electrified vehicle is shown as a plug-in hybrid electric vehicle (PHEV). The electrified vehicle 12 may include one or more electric machines 14 mechanically coupled to a gearbox or hybrid transmission 16. In some embodiments, each wheel of the vehicle has a dedicated electric machine 14. In some embodiments, a first electric machine 14 acts as a motor for the front wheels of the vehicle and a second electric machine 14 acts as a motor for the rear wheels of the vehicle. Each of the electric machines 14 may be capable of operating as a motor and a generator. In addition, the hybrid transmission 16 is mechanically coupled to an engine 18 and the hybrid transmission 16 is mechanically coupled to a drive shaft 20 that is mechanically coupled to a set a set of wheels 22. The electric machines 14 may provide propulsion and braking capability when the engine 18 is turned on or off. The electric machines 14 may also act as generators and provide fuel economy benefits by recovering energy that would normally be lost as heat in a friction braking system. The electric machines 14 may also reduce vehicle emissions by allowing the engine 18 to operate at more efficient speeds and allowing the electrified vehicle 12 to be operated in electric mode with the engine 18 off under certain conditions. The electrified vehicle 12 may also be a battery electric vehicle (BEV), a full hybrid electric vehicle (FHEV), a mild hybrid electric vehicle (MHEV), or other vehicle utilizing an electric drive and/or an electric motor. In a BEV configuration, the engine 18 may not be present.

A battery pack or traction battery 24 stores energy that may be used by the electric machines 14. The traction battery 24 may provide a high voltage direct current (DC) output. A contactor module 42 may include one or more contactors to isolate the traction battery 24 from a high-voltage bus 52 when opened and to connect the traction battery 24 to the high-voltage bus when closed. The high-voltage bus may include power and return conductors for carrying current. The contactor module 42 may be located adjacent to or within the traction battery 24. One or more power electronics modules 26 (which may also be referred to as an inverter or power module) may be electrically coupled to the source-voltage bus. The power electronics modules 26 are electrically coupled to the electric machines 14 and provide the ability to bi-directionally transfer energy between the traction battery 24 and the electric machines 14. For example, a traction battery 24 may provide a DC voltage while the electric machines 14 may operate with a three-phase alternating current (AC). The power electronics module 26 may convert the DC voltage to a three-phase AC current to operate the electric machines 14. In a regenerative mode, the power electronics module 26 may convert the three-phase AC current from the electric machines 14 acting as generators to the DC voltage compatible with the traction battery 24. The traction battery 24 may be a high-voltage (HV) battery including one or more battery cells linked to one another to power components of the vehicle 12 such as the motor.

In addition to providing energy for propulsion, the traction battery 24 may provide energy for other vehicle electrical systems. The electrified vehicle 12 may include a DC/DC converter module 28 that converts the high voltage DC output from the high-voltage bus to a low-voltage DC level of a low-voltage bus that is compatible with low-voltage loads 45. An output of the DC/DC converter module 28 may be electrically coupled to an auxiliary battery 30 (e.g., a 12V battery) for charging the auxiliary battery 30. The low-voltage loads 45 may be electrically coupled to the auxiliary battery 30 via the low-voltage bus. One or more high-voltage electrical loads 46 may be coupled to the high-voltage bus. The high-voltage electrical loads 46 may have an associated controller that operates and controls the high-voltage electrical loads 46 when appropriate. Examples of high-voltage electrical loads 46 may be a fan, an electric heating element and/or an air-conditioning compressor.

Traction battery 24 may be used to provide power to electrical devices. Electric vehicle 12 may have an on-board power supply system that allows the vehicle to use the traction battery 24 to provide large amounts of electrical power to its customers. The on-board power supply system may be used to power many industrial processes in the truck bed/or trailer such as asphalt bed heaters or tar kettles, etc. It should be appreciated that customers using some or all of these electrical appliances would not want to be shut off while the BEV charged, as their use may be important or even critical for industrial and/or personal uses. In various embodiments, the on-board power supply system is able to draw substantial amounts of power, which can have a non-trivial effect to the charging time. For example, different types of chargers may be able to provide different amounts of incoming charge power to an electric vehicle. For example, a L1 charger that plugs directly into a standard 120 volt (V) AC outlet may supply an average power output of 1.3 kW to 2.4 kW. For a typical EV, this power output would be equivalent to 3-5 miles of EV range per hour. As a second example, an electric vehicle charging at home on a 240-volt L2 charger may draw roughly 7.2 kW. As a point of comparison, an on-board power supply system may be used to power an electric furnace that can draw up to 10 kW or more and a water heater can use approximately 4.5 kW. Activation and control systems described herein may utilize various strategies to determine an appropriate distribution of incoming charge power from charging devices to facilitate the charging of a HV battery while simultaneously also providing power to electrical devices via the on-board power supply system.

In a PHEV embodiment, the electrified vehicle 12 may be configured to recharge the traction battery 24 via an external power source 36. The external power source 36 may include a connection to an electrical outlet. The external power source 36 may be electrically coupled to a charge station or an electric vehicle supply equipment (EVSE) 38. The external power source 36 may be an electrical power distribution network or grid as provided by an electric utility company. The EVSE 38 may provide circuitry and controls to manage the transfer of energy between the external power source 36 and the electrified vehicle 12. The external power source 36 may provide DC or AC electric power to the EVSE 38. The EVSE 38 may have a charge connector 40 for coupling to a charge port 34 of the vehicle 12. The charge port 34 may be any type of suitable port configured to transfer power from the EVSE 38 to the vehicle 12. The charge port 34 may be electrically coupled to an on-board power conversion module 32 which may operate as a charger. The power conversion module 32 may condition the power supplied from the EVSE 38 to provide appropriate voltage and current levels to the traction battery 24 and the high-voltage bus. The power conversion module 32 may interface with the EVSE 38 to coordinate the delivery of power to the electrified vehicle 12. The EVSE connector 40 may have pins to mate with corresponding recesses of the charge port 34.

One or more wheel brakes 44 may be provided for slowing the electrified vehicle 12 and preventing motion of the electrified vehicle 12. The wheel brakes 44 may be hydraulically actuated, electrically actuated, or some combination thereof. The wheel brakes 44 may be a part of a brake system 50. The brake system 50 may include other components to operate the wheel brakes 44.

Techniques described above in connection with FIG. 5 should be considered illustrative in nature and non-limiting in scope, unless otherwise made clear by the context of the disclosure. The environment described in FIG. 5 may be used to implement various techniques described in connection with FIGS. 1-4, which are described in greater detail throughout this disclosure.

Figure 6:
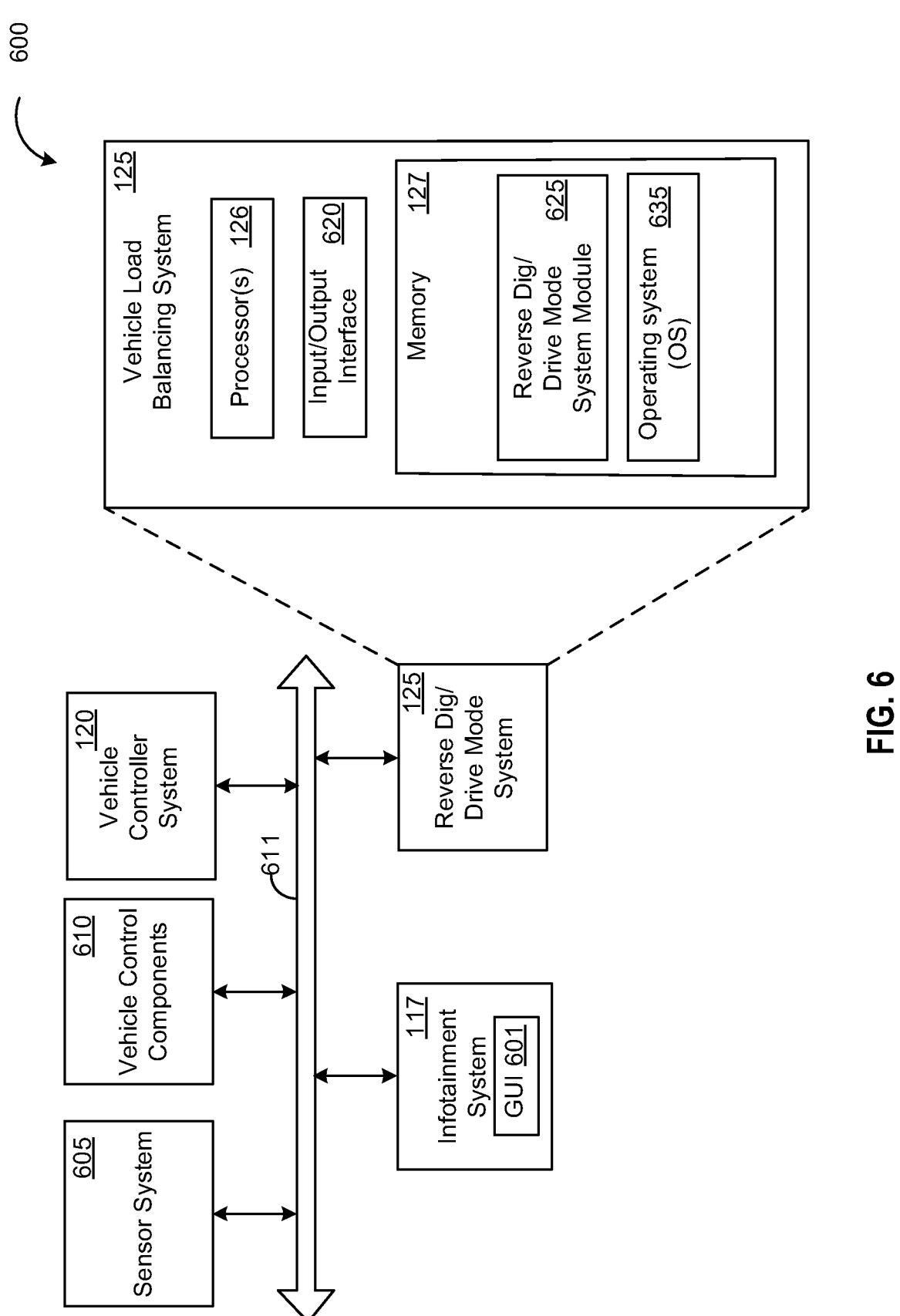
FIG. 6 shows a diagram 600 that depicts example components that can be included in vehicles described in accordance with one or more embodiments of the disclosure

FIG. 6 shows a diagram 600 that depicts example components that can be included in vehicles described in accordance with one or more embodiments of the disclosure. For example, the components illustrated in FIG. 6 may be utilized by vehicles described in the context of FIG. 1 and/or FIG. 2 and implement functionality related to reverse dig mode (e.g., in connection with FIG. 1) and/or reverse drive mode (e.g., in connection with FIG. 2). In various embodiments, an electric vehicle-such as those described in connection with FIG. 5—includes some or all of the components described in connection with FIG. 6. The example components can include a detector system 605, vehicle control components 610, the vehicle controller system 120, the infotainment system 117, and the reverse dig/drive mode system 125. The various components are communicatively coupled to each other via one or more buses such as an example bus 611. The bus 611 may be implemented using various wired and/or wireless technologies. For example, the bus 611 can be a vehicle bus that uses a controller area network (CAN) bus protocol, a Media Oriented Systems Transport (MOST) bus protocol, and/or a CAN flexible data (CAN-FD) bus protocol. Some or all portions of the bus 611 may also be implemented using wireless technologies such as Bluetooth®, Bluetooth®, Ultra-Wideband, Wi-Fi, Zigbee®, or near-field-communications (NFC).

The detector system 605 can include various types of detectors/sensors such as, for example, rear-facing cameras described in connection with FIG. 2. For example, a camera can provide an image of the surroundings in one of various formats (jpeg, mpeg, etc.).

The vehicle control components 610 can include various components and systems associated with driving-related functions of the vehicle as well as with functions that are associated with the reverse dig/drive mode system 125. Some example driving-related functions can include the operation of various vehicle components (engine, brakes, accelerator, fuel injection, etc.), and actions such as collision mitigation, automatic braking, and cruise control. The vehicle control components 610 may be controlled, activated, and/or operated by the vehicle controller system 120. In some cases, some of the vehicle control components 610 may be controlled, activated, and/or operated by the reverse dig/drive mode system 125. For example, the reverse dig/drive mode system 125 may utilize some of the vehicle control components 610 to determine input controls to a steering wheel (e.g., clockwise or counterclockwise turn) and to cause the rear wheels of the vehicle to perform a corresponding inverted or conventional turn to be performed, depending on whether the vehicle is in reverse drive mode or reverse dig mode.

The infotainment system 117 can include a display system having a GUI 601 for carrying out various operations. The GUI may be used by the driver of the vehicle to interact with the reverse dig/drive mode system 125, such as, for example, to receive instructions on how to engage reverse drive mode and/or reverse dig mode.

A vehicle may have a front center console in which various controls are integrated. In various embodiments, a vehicle comprises an in-vehicle infotainment system 117 that implements a human-machine interface (HMI). In various embodiments, the human-machine interface includes a touchscreen configured to display information to a user and allow the user to provide inputs by touching the touchscreen. While a touchscreen described herein, this disclosure is not limited to touchscreens, and extends to other types of displays and human-machine interfaces and a user may interact with the HMI and that the user may also interact with the HMI through physical buttons, voice commands, augmented reality (AR) tools, camera-based commands, and more.

Among other functions, the infotainment system 117 is configured to present visual representations of a human-machine interface. For example, when reverse dig and/or drive mode is engaged, a video feed from a rear-facing camera may be presented on the infotainment system 117 that provides the driver with a view of the terrain being traversed.

The reverse dig/drive mode system 125 can be implemented in various ways. In one example implementation, the reverse dig/drive mode system 125 can be an independent device (enclosed in an enclosure, for example). In another example implementation, some or all components of the reverse dig/drive mode system 125 can be housed, merged, or can share functionality, with the vehicle controller system 120. For example, an integrated unit that combines the functionality of the reverse dig/drive mode system 125 with that of the vehicle controller system 120 can be operated by a single processor and a single memory device. In the illustrated example configuration, the reverse dig/drive mode system 125 includes the processor 126, an input/output interface 620, and a memory 127.

While FIG. 6 depicts reverse dig and drive modes to be implemented in a single system, the functionality of reverse dig mode and reverse drive mode may, in various other embodiments, be implemented as separate systems that can be implemented independent of each other or as modular components of vehicle that can be implemented alongside each other.

The input/output interface 620 is configured to provide communications between the reverse dig/drive mode system 125 and other components coupled to the bus 611 such as, for example, the detectors/sensors of the detector system 605.

The memory 127, which is one example of a non-transitory computer-readable medium, may be used to store an operating system (OS) 635, an image evaluation module 630, and various code modules such as, for example, a reverse dig/drive mode system module 625. The code modules are provided in the form of computer-executable instructions that can be executed by the processor 126 for performing various operations in accordance with the disclosure. In various embodiments, the memory 127 comprises separate code modules for reverse drive mode and reverse dig mode that can be executed by processor 126 independently of each other.

The reverse dig/drive mode system module 625 may be executed by the processor 126 for performing various operations in accordance with the disclosure. Some example operations are described above. Execution of some of these operations can involve the reverse dig/drive mode system module 625 performing process steps described in connection with FIG. 3 and/or FIG. 4.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cable box, a wearable smart device, cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a wearable smart device, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, DOCSIS, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Implementations of the systems, apparatuses, devices, and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
determining, by one or more processors of a controller system of a vehicle, engagement of reverse dig mode;
determining, by the one or more processors and based on a direction that a steering wheel of the vehicle is turned, an inner front wheel and an outer front wheel;
simultaneously applying a forward torque to the inner front wheel of the vehicle and a reverse torque to the outer front wheel of the vehicle; and
applying a reverse torque to rear wheels of the vehicle.

2. The method of claim 1, wherein the reverse dig mode is engaged by a user commands received via a human-machine interface (HMI) of the vehicle.

3. The method of claim 2, further comprising:
determining, by the one or more processors, that one or more front wheels of the vehicle are stuck; and
presenting, by the one or more processors and using the HMI, a recommendation to engage the reverse dig mode.

4. The method of claim 1, wherein applying the forward torque to the inner front wheel of the vehicle comprises applying a brake to the inner front wheel.

5. The method of claim 1, wherein a motor applies the reverse torque to the outer front wheel of the vehicle.

6. The method of claim 1, wherein:
a counterclockwise turn of the steering wheel results in a clockwise turn of the vehicle; and
a clockwise turn of the steering wheel results in a counterclockwise turn of the vehicle.

7. The method of claim 1, further comprising applying, based on the direction that the steering wheel of the vehicle is turned, a conventional turn to the rear wheels of the vehicle.

8. A vehicle, comprising a controller system with one or more processors and executable instructions, as a result of execution by the one or more processors, causes the vehicle to:
determine engagement of reverse dig mode;
determine, based on a direction that a steering wheel of the vehicle is turned, an inner front wheel and an outer front wheel;
simultaneously apply a forward torque to the inner front wheel of the vehicle and a reverse torque to the outer front wheel of the vehicle; and
apply a reverse torque to rear wheels of the vehicle.

9. The vehicle of claim 8, wherein the reverse dig mode is engaged by a user commands received via a human-machine interface (HMI) of the vehicle.

10. The vehicle of claim 9, wherein the executable instructions further cause the vehicle to:

determine that one or more front wheels of the vehicle are stuck; and present, using the HMI, a recommendation to engage the reverse dig mode.

11. The vehicle of claim 8, wherein the forward torque to the inner front wheel of the vehicle is applied by one or more brakes of the vehicle.

12. The vehicle of claim 8, wherein a motor is used to apply the reverse torque to the outer front wheel of the vehicle.

13. The vehicle of claim 8, wherein:

a counterclockwise turn of the steering wheel results in a clockwise turn of vehicle; and a clockwise turn of the steering wheel results in a counterclockwise turn of the vehicle.

14. The vehicle of claim 8, wherein the controller system is further configured to apply, based on the direction that the steering wheel of the vehicle is turned, a conventional turn to the rear wheels of the vehicle.

\* \* \* \* \*